US012098244B2

(12) United States Patent
Jacquel et al.

(10) Patent No.: US 12,098,244 B2
(45) Date of Patent: Sep. 24, 2024

(54) PROCESS FOR SYNTHESISING SEMI-AROMATIC POLYETHERS

(71) Applicant: ROQUETTE FRERES, Lestrem (FR)

(72) Inventors: Nicolas Jacquel, Lambersart (FR); Sarah Degras, Villeurbanne (FR); Régis Mercier, Villeurbanne (FR)

(73) Assignee: Roquette Freres, Lestrem (FR)

( * ) Notice: Subject to any disclaimer, the term of this patent is extended or adjusted under 35 U.S.C. 154(b) by 76 days.

(21) Appl. No.: 17/594,169

(22) PCT Filed: Apr. 3, 2020

(86) PCT No.: PCT/EP2020/059623
§ 371 (c)(1),
(2) Date: Oct. 5, 2021

(87) PCT Pub. No.: WO2020/201532
PCT Pub. Date: Oct. 8, 2020

(65) Prior Publication Data
US 2022/0177648 A1    Jun. 9, 2022

(30) Foreign Application Priority Data
Apr. 5, 2019  (FR) ..................................... 19 03648

(51) Int. Cl.
*C08G 65/40*     (2006.01)
*B01D 71/52*     (2006.01)
*B01D 71/68*     (2006.01)
*C08G 75/23*     (2006.01)

(52) U.S. Cl.
CPC ......... *C08G 65/405* (2013.01); *B01D 71/522* (2022.08); *B01D 71/68* (2013.01); *C08G 65/4093* (2013.01); *C08G 75/23* (2013.01); *C08G 2650/26* (2013.01); *C08G 2650/40* (2013.01); *C08G 2650/64* (2013.01)

(58) Field of Classification Search
CPC .. C08G 65/405; C08G 65/4093; C08G 65/40; C08G 65/4012; C08G 75/23; C08G 2650/02; C08G 2650/40; C08G 2650/64; C08G 61/127; C08G 73/1071; C08G 2261/122; C08G 2261/45; C08G 2261/312; C08G 2261/334; C08G 2261/3323; B01D 71/68; C07C 49/84; C07C 45/46; D01F 6/665
See application file for complete search history.

(56) References Cited

U.S. PATENT DOCUMENTS

| | | | |
|---|---|---|---|
| 2014/0186624 A1* | 7/2014 | Sriram | C08G 75/23 528/223 |
| 2015/0129487 A1 | 5/2015 | Bhatnagar et al. | |
| 2015/0299395 A1* | 10/2015 | Taylor | B01D 71/68 210/500.28 |
| 2017/0240708 A1* | 8/2017 | Lim | C08G 75/20 |

FOREIGN PATENT DOCUMENTS

| | | |
|---|---|---|
| EP | 3170855 A1 | 5/2017 |
| FR | 1407301 A | 7/1965 |
| WO | 2013/023997 A1 | 2/2013 |
| WO | 2014/072473 A2 | 5/2014 |

OTHER PUBLICATIONS

Majdoub M, et al. "Nouveaux polyethers et polyesters a base d'isosorbide: synthese et caracterisation" European Polymer Journal, Pergamon Press Ltd. Oxford, GB, vol. 30, No. 12, Dec. 1, 1994 (Dec. 1, 1994), pp. 1431-1437, [retrieved on Dec. 1, 1994] DOI: 10.1016/0014-3057(94) 90274-7 ISSN: 0014-3057, XP024053303; p. 1431, right-hand column, line 20—p. 1434, right-hand column, line 2; figure diagram 1; tables 1, 2; compound polyether III.
H. Kricheldorf et al., J. Polymer Sci., Part A: Polym. Chem., 1995, 33, 2667-2671.
S. Chatti, et al., High Perform. Polym., 2009, 21, 105-118.
H. W. Kim et al., Journal of Membrane Science, vol. 372, No. 1, p. 116-124, 2011.
K. M. Diederichsen 5 et al., Macromolecules, vol. 50, No. 10, p. 3831-3840, 2017.
H. J. Lee, et al., Journal of Membrane Science, vol. 485, p. 10-16, 2015.
L. Jujie, X. he, et al., J Polym Res, vol. 24, No. 1, p. 1, 2017.
F. Hancock, et al., Biomaterials, vol. 21, No. 7, p. 725-733, 2000.
L. Wang et al., Polymer Chemistry, vol. 5, No. 8, p. 2836-2842, 2014.
R. N. Johnson and A. G. Farnham, J. Polym. Sci. A-1 Polym. Chem., vol. 5, No. 9, p. 2415-2427, 1967.

* cited by examiner

*Primary Examiner* — Shane Fang

(57) ABSTRACT

The invention relates to a process for producing semi-aromatic polyethers based on an aliphatic diol, to semi-aromatic polyethers based on an aliphatic diol obtained by said process, and to the use of said semi-aromatic polyethers based on an aliphatic diol for manufacturing membranes, manufactured parts and coatings.

8 Claims, No Drawings

PROCESS FOR SYNTHESISING SEMI-AROMATIC POLYETHERS

TECHNICAL FIELD

The invention relates to the field of polymers and relates to a method for synthesizing semi-aromatic polyethers based on aliphatic diols, to the semi-aromatic polyethers based on aliphatic diols obtained by said method, and to the use of said semi-aromatic polyethers based on aliphatic diols for manufacturing membranes, manufactured parts and coatings.

PRIOR ART

Aromatic polyethers obtained by nucleophilic aromatic substitution, such as polyethersulfones, polyetherketones and polyetherbenzonitriles, are recognized as high performance polymers because of their excellent thermal stability and mechanical properties. The main application of these polymers is in liquid and gas phase separation membranes. The polyethersulfones available on the market are synthesized in particular from aromatic diols such as bisphenol A or 4,4'-dihydroxyphenyl with dichlorodiphenyl sulfone. Manufacturers have thus turned their attention to partially or totally substituting aromatic diols such as bisphenol A, known to be an endocrine disruptor, with aliphatic diols.

Isohexides, or 1,4:3,6-dianhydrohexitols, are rigid bicyclic chiral diols derived from sugars. In particular, isosorbide is obtained from the double dehydrogenation reaction of sorbitol, itself derived from the glucose hydrogenation reaction. Isohexides are intermediates of choice in the synthesis of many compounds that have applications in different fields such as the plastics industry, thus replacing their petrochemical-derived counterparts.

Thus, Kricheldorf et al. first described the preparation and characterization of isosorbide-containing polyethersulfones from silylated isosorbide and difluorodiphenylsulfone (H. Kricheldorf et al., J. Polymer Sci., Part A: Polym. Chem., 1995, 33, 2667-2671).

Because of the high cost of silylated isosorbide, Kricheldorf and Chatti modified their polymerization conditions and described the synthesis of isosorbide-containing polyethersulfones from non-functionalized isosorbide and difluorodiphenylsulfone in the presence of potassium carbonate (S. Chatti et al., High Perform. Polym., 2009, 21, 105-118).

Application WO 2013/023997 A1 describes a method for the preparation of aromatic polyetherketones based on isosorbide. The method involves the reaction between 4,4'-difluorobenzophenone and isosorbide in the presence of potassium carbonate at a temperature of 210° C.

Application WO 2014/072473 A2 describes a method for the preparation of aromatic polyethersulfones based on isosorbide. The method involves the reaction between difluorodiphenylsulfone or dichlorodiphenylsulfone, optionally in the presence of a fluorinating agent, and isosorbide in the presence of potassium carbonate at a temperature of 210° C.

Application US 2015/0129487 A1 describes a method for the preparation of semi-aromatic polyethersulfones based on non-aromatic cyclic diols such as cyclohexanedimethanol, 1,5-cyclooctanediol or tetramethylcyclobutanediol. The method involves the reaction between 4,4'-difluorodiphenylsulfone and a non-aromatic cyclic diol in the presence of potassium carbonate at a minimum temperature of 160° C. and the reaction between 4,4'-dichlorodiphenylsulfone and a non-aromatic cyclic diol in the presence of potassium carbonate at a minimum temperature of 210-215° C.

To improve the hydrophilicity of the polysulfone with a view to an application in membranes, some researchers have attempted to copolymerize polysulfone with PEG or PEO. Copolymerization can be statistical with bisphenol A (H. W. Kim et al., Journal of Membrane Science, vol. 372, No. 1, p. 116-124, 2011), fluorene-9-bisphenol, (K. M. Diederichsen et al., Macromolecules, vol. 50, No. 10, p. 3831-3840, 2017), hydroxyphenylfluorene (H. J. Lee, et al., Journal of Membrane Science, vol. 485, p. 10-16, 2015) or bisphenol AF (L. Jujie, X. he, et al, J Polym Res, vol. 24, no. 1, p. 1, 2017.). Generally, only oligomers are obtained using dichlorodiphenyl sulfone at high temperatures (Mn=4,000-13,000 g/mol). If difluorodiphenyl sulfone is used under the conventional conditions for polysulfone synthesis, then polymers with high molecular weights are obtained.

Block copolymerization is also considered by nucleophilic aromatic substitution between two blocks (L. F. Hancock, et al., Biomaterials, vol. 21, no. 7, p. 725-733, 2000.) or by transetherification between a polymer and a PEG oligomer in the presence of the strong base NaH (L. Wang et al., Polymer Chemistry, vol. 5, no. 8, p. 2836-2842, 2014.).

Thus, since diols have a lower reactivity compared to bisphenols (e.g. bisphenol A), methods for the preparation of polyethersulfones based on diols and dichlorodiphenyl sulfone of the prior art require either heating at high temperature (210-215° C.) in the presence of a weak base such as K2CO3, or the use of a strong base such as NaH, which makes it possible to moderate the temperatures. Nevertheless, strong bases are known to cause secondary hydrolysis reactions of the dihalogenated diphenyl sulfone (R. N. Johnson and A. G. Farnham, J. Polym. Sci. A-1 Polym. Chem., vol. 5, no. 9, p. 2415-2427, 1967).

Technical Problem

These known solutions have the disadvantage of requiring either difluorodiphenyl sulfone, which is a reactive but costly monomer, or dichlorodiphenyl sulfone at high reaction temperatures and with long reaction times. These known solutions represent a disadvantage in terms of productivity, profitability and energy savings from an industrial point of view.

Thus, there is a need for a method for the preparation of semi-aromatic polyethers based on aliphatic diols that requires neither an expensive monomer, nor high temperatures, nor long reaction times, and that makes it possible to obtain polymers with high number-average molecular weights.

SUMMARY OF THE INVENTION

The invention improves the situation in that it makes it possible to obtain semi-aromatic polyethers by nucleophilic aromatic substitution based on aliphatic diols with high number-average molecular weights without requiring heating at high temperature for long periods of time.

The invention relates to a method for the preparation of semi-aromatic polyethers based on aliphatic diols comprising the following successive steps:

a) preparation of a mixture comprising an aliphatic diol or a mixture of aliphatic diols, a dihalogenated aromatic or heteroaromatic compound, a hindered strong base in an organic solvent; and b) heating said mixture at a temperature between 30° C. and 120° C. for a period of less than or equal to 12 hours.

The invention also relates to a semi-aromatic polyether based on an aliphatic diol of formula I, which can be obtained by said method:

[Chem. 1]

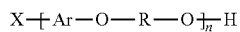

(I)

wherein
Ar originates from a dihalogenated aromatic or heteroaromatic compound;
R originates from an aliphatic diol;
X is a halogen;
n is an integer between 2 and 100, with n being determined by size-exclusion chromatography.

The invention also relates to the use of a semi-aromatic polyether according to the invention for the manufacture of membranes, manufactured parts and coatings.

The characteristics disclosed in the following paragraphs may, optionally, be implemented. They can be implemented independently of each other or in combination with each other.

In one embodiment, the aliphatic diol used in step a) of the method of the invention is selected from linear aliphatic diols, branched aliphatic diols and cyclic aliphatic diols.

In one embodiment, the aliphatic diol used in step a) of the method of the invention is a branched aliphatic diol.

In one embodiment, the aliphatic diol used in step a) of the method of the invention is a cyclic aliphatic diol.

In one embodiment, the linear diol used in step a) of the method of the invention is a linear aliphatic diol.

In one embodiment, the aliphatic diol used in step a) of the method of the invention is selected from 1,4:3,6-dianhydrohexitols.

In one embodiment, the 1,4:3,6-dianhydrohexitol used in step a) of the method of the invention is isosorbide.

In one embodiment, the dihalogenated aromatic or heteroaromatic compound used in step a) of the method of the invention is selected from dihalogenated aromatic sulfones, dihalogenated aromatic ketones, dihalogenated benzonitriles, dihalogenated diazenes, bis(halophenyl)oxadiazoles, dihalogenated nitrobenzenes, dihalogenated benzoylnaphthalenes, and dihalogenated pyridines.

In one embodiment, the hindered strong base used in step a) of the method of the invention is selected from potassium tert-butylate, sodium tert-butylate, lithium tert-butylate, potassium tert-pentylate, sodium tert-pentylate, potassium trimethylsilanolate, sodium trimethylsilanolate, lithium trimethylsilanolate, potassium tetramethylpiperidide, lithium tetramethylpiperidide, potassium bis(trimethylsilyl)amide, and lithium bis(trimethylsilyl)amide.

In one embodiment, the molar ratio of hindered strong base/aliphatic diol is between 1 and 3.

In one embodiment, the organic solvent used in step a) of the method of the invention is a polar aprotic solvent or a mixture of polar aprotic solvents.

In one embodiment, the molar ratio of aliphatic diol/dihalogenated aromatic compound is between 0.5 and 1.5.

In one embodiment, the semi-aromatic polyether based on an aliphatic diol of the invention is characterized in that R originates from an aliphatic diol selected from linear aliphatic diols and branched aliphatic diols.

In one embodiment, the semi-aromatic polyether based on an aliphatic diol of the invention is characterized in that R originates from a 1,4:3,6-dianhydrohexitol.

In one embodiment, the semi-aromatic polyether based on an aliphatic diol of the invention is characterized in that its polydispersity index is between 1.5 and 5.

In one embodiment, the semi-aromatic polyether based on an aliphatic diol of the invention is characterized in that its number-average molecular weight is greater than or equal to 5,000 g/mol, said number-average molecular weight being measured by size-exclusion chromatography in dimethylformamide at 70° C. with a flow rate of 0.7 mL/min and with polystyrene calibration.

In one embodiment, the semi-aromatic polyether based on an aliphatic diol of the invention is characterized in that it has a glass transition temperature of greater than 100° C.

In one embodiment, the semi-aromatic polyether based on an aliphatic diol of formula I is characterized in that X is chlorine.

In one embodiment, the semi-aromatic polyether based on an aliphatic diol of formula I is characterized in that it contains a residual fluorine content of less than 100 ppm.

In one embodiment, the semi-aromatic polyether based on an aliphatic diol of formula I is characterized in that it contains a residual silicon content of between 10 and 1,000 ppm.

In one embodiment, the semi-aromatic polyether based on an aliphatic diol of formula I is characterized in that it contains a residual chlorine content of between 100 and 10,000 ppm.

Technical Solution

The invention and its variants may make it possible, generally, to propose a method for the preparation of semi-aromatic polyethers based on an aliphatic diol.

Surprisingly and unexpectedly, the applicant has shown that it is possible to synthesize semi-aromatic polyethers from an aliphatic diol, particularly a secondary aliphatic diol, and a dihalogenated aromatic or heteroaromatic compound in the presence of a hindered strong base at a temperature of less than or equal to 120° C. for a period of less than or equal to 12 hours.

Benefits Provided

Such a solution makes it possible to solve the problems posed by known solutions and to obtain semi-aromatic polyethers based on an aliphatic diol with high number-average molecular weights, i.e. greater than 5,000 g/mol, preferably greater than 6,000 g/mol, more preferably still greater than 7,000 g/mol, said number-average molecular weights being measured by size-exclusion chromatography in dimethylformamide at 70° C. with a flow rate of 0.7 mL/min and with polystyrene calibration, without the need for high temperature heating.

In addition, the method described by the applicant has the advantages of being faster than the usual methods, of using non-toxic solvents, and of making it possible to obtain non-colored polymers.

Other features, details and benefits of the invention will become apparent on reading the following detailed description.

DETAILED DESCRIPTION

The present invention relates to a method for the preparation of semi-aromatic polyethers based on an aliphatic diol comprising the following successive steps:

a) preparation of a mixture comprising an aliphatic diol or a mixture of aliphatic diols, preferably an aliphatic diol, a dihalogenated aromatic or heteroaromatic compound, a hindered strong base in an organic solvent, and b) heating said mixture at a temperature of between 30° C. and 120° C., preferably at a temperature of between 35° C. and 110° C., more preferably still at a temperature of between approximately 40° C. and approximately 100° C., for a period of less than or equal to 12 hours, preferably less than or equal to 11 hours, more preferably still less than or equal to 10 hours.

"Semi-aromatic polyether" for the purposes of the present invention means a polyether-type polymer formed from two monomers, one of which is aromatic or heteroaromatic and the other of which is non-aromatic.

Thus, the first step of the method according to the invention consists in preparing a mixture comprising an aliphatic diol or a mixture of aliphatic diols, preferably an aliphatic diol, a dihalogenated aromatic compound, a hindered strong base in an organic solvent.

"Aliphatic diol" means, for the purposes of the present invention, a non-aromatic organic compound comprising two hydroxyl functions. The aliphatic diol may be linear, branched or cyclic. For the purposes of the present invention, "linear aliphatic diols" and "branched aliphatic diols" do not comprise rings. For the purposes of the present invention, "cyclic aliphatic diols" comprise one or more rings. Preferably, the aliphatic diol is a branched aliphatic diol or a cyclic aliphatic diol. More preferably still, the aliphatic diol is a branched aliphatic diol. The aliphatic diol may, in addition to the oxygen atoms of the two hydroxyl groups, comprise one or more heteroatoms, for example atoms of oxygen, nitrogen and sulfur. The aliphatic diol is used in the present invention as a monomer for the formation of the semi-aromatic polyether. As examples of linear aliphatic diols, mention may be made of ethylene glycol, 1,3-propanediol, 1,4-butanediol, 1,5-pentanediol, 1,6-hexanediol, 1,8-octanediol and/or 1,10-decanediol. As examples of branched aliphatic diols, mention may be made of 2-methyl-1,3-propanediol, 2,2-dimethylpropane-1,3-diol, 2,2,4-trimethyl-1,3-pentanediol, 2-ethyl-2-butyl-1,3-propanediol and/or propylene glycol. As examples of cyclic aliphatic diols, mention may be made of cyclohexanedimethanols, tetramethylcyclohexanedimethanol, hydrogenated bisphenols, 1,5-cyclooctanediol, 1,4:3,6-dianhydrohexitols, spiroglycols, adamantanediols and/or tricyclododecanedimethanol.

"1,4:3,6-dianhydrohexitol" means, for the purposes of the invention, a heterocyclic compound obtained by double dehydration of a hexitol such as mannitol, sorbitol and iditol. The 1,4:3,6-dianhydrohexitols are primarily in the form of stereoisomers: isomannide, isosorbide, and isoidide. 1,4:3,6-dianhydrohexitol is used in the present invention as a monomer for the formation of the semi-aromatic polyether. Preferably, the 1,4:3,6-dianhydrohexitol used in step a) of the method of the invention is isosorbide.

"Dihalogenated aromatic compound" means, for the purposes of the present invention, a compound comprising at least one aromatic ring, preferably two aromatic rings, two halogen atoms, and an electron withdrawing-type function. The halogen atoms are selected from bromine, iodine, chlorine or fluorine, preferably from chlorine and fluorine; more preferentially, the halogen atoms are chlorine atoms. Advantageously, the two halogen atoms are identical. The dihalogenated aromatic compound is used in the present invention as a monomer for the formation of the semi-aromatic polyether.

The term "dihalogenated heteroaromatic compound" means, for the purposes of the present invention, a compound comprising at least one heteroaromatic ring, and two halogen atoms. The halogen atoms are selected from bromine, iodine, chlorine or fluorine, preferably from chlorine and fluorine; more preferentially, the halogen atoms are chlorine atoms. Advantageously, the two halogen atoms are identical. The dihalogenated heteroaromatic compound is used in the present invention as a monomer for the formation of the semi-aromatic polyether.

The dihalogenated aromatic or heteroaromatic compound used in step a) of the method of the invention is advantageously selected from dihalogenated aromatic sulfones, dihalogenated aromatic ketones, dihalogenated benzonitriles, dihalogenated diazenes, bis(halophenyl)oxadiazoles, dihalogenated nitrobenzenes, dihalogenated benzoylnaphthalenes and dihalogenated pyridines. Preferably, the dihalogenated aromatic or heteroaromatic compound is selected from dihalodiphenyl sulfones, dihalodiphenyl ketones, dihalogenated benzonitriles and dihalogenated pyridines. More preferably still, the dihalogenated aromatic or heteroaromatic compound is selected from dichlorodiphenyl sulfones, dichlorodiphenyl ketones, dichlorobenzonitriles and dichloropyridines. More preferentially, the dihalogenated aromatic or heteroaromatic compound is selected from 4,4'-dichlorodiphenyl sulfone, 4,4'-dichlorobenzophenone, 2,6-dichlorobenzonitrile and 2,6-dichloropyridine. Even more preferentially, the dihalogenated aromatic or heteroaromatic compound is selected from 4,4'-dichlorodiphenyl sulfone, 2,6-dichlorobenzonitrile and 2,6-dichloropyridine.

The term "hindered strong base" means, for the purposes of the invention, a base comprising a group of atoms occupying a large volume, such as a branched aliphatic group. Preferably, the hindered strong base is selected from potassium tert-butylate, sodium tert-butylate, lithium tert-butylate, potassium tert-pentylate, sodium tert-pentylate, potassium trimethylsilanolate, sodium trimethylsilanolate, lithium trimethylsilanolate, potassium tetramethylpiperidide, lithium tetramethylpiperidide, potassium bis(trimethylsilyl)amide, and lithium bis(trimethylsilyl)amide. More preferably still, the hindered strong base used in step a) of the method of the invention is potassium trimethylsilanolate.

In fact, and without wishing to be bound by any theory, the inventors believe that using a hindered strong base at a temperature of less than or equal to 120° C. makes it possible to limit the secondary reactions that can be triggered when using an unhindered strong base, and thus makes it possible to produce polymers with high number-average molecular weights, i.e. number-average molecular weights of greater than 5,000 g/mol, preferably greater than 6,000 g/mol, more preferably still greater than 7,000 g/mol, said number-average molecular weights being measured by size-exclusion chromatography in dimethylformamide at 70° C. with a flow rate of 0.7 mL/min and with polystyrene calibration.

Advantageously, the proportion of hindered strong base in the mixture is between 1 and 3 mole equivalents relative to the amount of aliphatic diol. Thus, the molar ratio of hindered strong base/aliphatic diol is between 1 and 3. Preferably, the molar ratio of hindered strong base/aliphatic diol is approximately 2.

The organic solvent used in step a) of the method of the invention is advantageously selected from polar aprotic solvents.

The term "polar aprotic solvent" means, for the purposes of the present invention, a solvent having a dipole moment without an acidic hydrogen atom, i.e. bonded to a heteroatom.

Preferably, the solvent is selected from polar aprotic solvents containing at least one sulfur atom or at least one nitrogen atom. More preferably still, the solvent is selected from dimethyl sulfoxide, diethyl sulfoxide, sulfolane, dimethyl sulfone, diethyl sulfone, diisopropyl sulfone, diphenyl sulfone, tetrahydrothiophene-1-monoxide, dimethylacetamide, N,N-dimethylformamide, fluorine methyl-5-(dimethylamino)-2-methyl-5-oxopentanoate, N-methyl-2-pyrrolidone, N-cyclohexyl-2-pyrrolidone, either alone or in a mixture. More preferentially, the solvent is dimethyl sulfoxide.

The aliphatic diol used in step a) of the method of the invention is advantageously selected from linear aliphatic diols, branched aliphatic diols and cyclic aliphatic diols. Preferably, the aliphatic diol used in step a) of the method of the invention is selected from branched aliphatic diols and cyclic aliphatic diols. More preferably still, the aliphatic diol used in step a) of the method of the invention is selected from branched aliphatic diols.

In one embodiment, the aliphatic diol used in step a) of the method of the invention is a linear aliphatic diol. Preferably, the linear aliphatic diol used in step a) of the method of the invention is selected from ethylene glycol, 1,3-propanediol, 1,4-butanediol, 1,5-pentanediol, 1,6-hexanediol, 1,8-octanediol and 1,10-decanediol, either alone or in a mixture.

In a preferred embodiment, the aliphatic diol used in step a) of the method of the invention is a branched aliphatic diol. Preferably, the branched aliphatic diol used in step a) of the method of the invention is selected from 2-methyl-1,3-propanediol, 2,2-dimethylpropane-1,3-diol, 2,2,4-trimethyl-1,3-pentanediol, 2-ethyl-2-butyl-1,3-propanediol and propylene glycol, either alone or in a mixture. More preferably still, the branched aliphatic diol used in step a) of the method of the invention is 2,2-dimethylpropane-1,3-diol.

In a preferred embodiment, the aliphatic diol used in step a) of the method of the invention is a cyclic aliphatic diol. Preferably, the cyclic aliphatic diol used in step a) of the method of the invention is selected from cyclohexanedimethanols, tetramethylcyclohexanedimethanol, hydrogenated bisphenols, 1,5-cyclooctanediol, 1,4:3,6-dianhydrohexitols, spiroglycols, adamantanediols, and tricyclododecanedimethanol, either alone or in a mixture. More preferably still, the cyclic aliphatic diol used in step a) of the method of the invention is selected from 1,4:3,6-dianhydrohexitols. More preferentially, the cyclic aliphatic diol used in step a) of the method of the invention is isosorbide.

The isosorbide used may be in solid form, in particular in powder, granule or flake form, or in liquid form, in particular in molten form. Preferably, the isosorbide is present in solid form.

In another particularly preferred embodiment, the dihalogenated aromatic or heteroaromatic compound used in step a) of the method of the invention is a dichlorinated aromatic compound. Preferably, the dihalogenated aromatic or heteroaromatic compound used in step a) of the method of the invention is selected from the dichlorinated aromatic sulfonates, dichlorinated aromatic ketones, dichlorinated benzonitriles and dichlorinated pyridines. More preferably still, the dihalogenated aromatic or heteroaromatic compound used in step a) of the method of the invention is selected from dichlorodiphenyl sulfones, dichlorodiphenyl ketones, dichlorobenzonitriles and dichloropyridines. More preferentially, the dihalogenated aromatic or heteroaromatic compound used in step a) of the method of the invention is selected from 4,4'-dichlorodiphenyl sulfone, 4,4'-dichlorobenzophenone, 2,6-dichlorobenzonitrile and 2,6-dichloropyridine. Even more preferably, the dihalogenated aromatic or heteroaromatic compound used in step a) of the method of the invention is selected from 4,4'-dichlorodiphenyl sulfone, 2,6-dichlorobenzonitrile and 2,6-dichloropyridine.

Advantageously, the use of dichlorinated aromatic derivatives in the method of the invention makes it possible to obtain semi-aromatic polyethers having high number-average molecular weights comparable to those obtained in the case of semi-aromatic polyethers prepared from difluorinated aromatic derivatives. The use of dichlorinated aromatic derivatives thus has an economic advantage, because they are often cheaper than the corresponding difluorinated aromatic derivatives.

In addition, the method of the invention unexpectedly makes it possible to improve the substitution kinetics when a dichlorinated aromatic or heteroaromatic compound is used in step a). Indeed, the methods of the prior art usually use difluorinated monomers to compensate for the low reactivity of aliphatic diols.

The nature of the halogenated derivative used can be identified by analysis of the polymer by combustion ion chromatography.

Advantageously, the molar ratio of dihalogenated aromatic or heteroaromatic compound/aliphatic diol in the mixture is between 0.5 and 1.5, preferably between 0.7 and 1.3, more preferably still between 0.9 and 1.1. More preferentially, the molar ratio of dihalogenated aromatic or heteroaromatic compound/aliphatic diol in the mixture is approximately 1.

Thus, the semi-aromatic polyether is formed by reaction between the aliphatic diol and the dihalogenated aromatic or heteroaromatic compound as monomers. Advantageously, the total proportion of monomers, i.e. the sum of the quantity of aliphatic diol and the amount of dihalogenated aromatic or heteroaromatic compound is between 10% and 50%, preferably between 20% and 40% by weight relative to the sum of the weight of the solvent and the weight of the monomers. More preferably still, the proportion of monomers is approximately 30% by weight relative to the weight of the solvent and the weight of the monomers.

The second step of the method of the invention consists in heating the mixture prepared in step a) to a temperature of between 30° C. and 120° C. for a period of less than or equal to 12 hours. This heating step allows the reaction between aliphatic diol and the dihalogenated aromatic or heteroaromatic compound to be initiated in order to form the semi-aromatic polyether.

Preferably, the heating step is carried out at a temperature of between 35° C. and 110° C., more preferably still between 40° C. and 100° C., for a period of less than or equal to 11 hours, more preferably still of less than or equal to 10 hours.

Thus, the method of the invention is particularly advantageous in terms of productivity since it makes it possible to obtain semi-aromatic polyethers in a period of less than or equal to 12 hours, but also in terms of energy saving since it does not require heating to a temperature of greater than 120° C.

In a particular embodiment, the heating step is started at a temperature of between 30° C. and 50° C., preferably between 35° C. and 45° C., more preferably still at a temperature of approximately 40° C., then the temperature is gradually increased to a temperature of between 80° C. and 120° C., preferably between 90° C. and 110° C., more preferably still at a temperature of approximately 100° C.

It is to the inventors' credit to have shown that starting the heating step at a temperature of between 30° C. and 50° C. and gradually increasing the temperature to a temperature of between 80° C. and 120° C. makes it possible to prevent the degradation of the dihalogenated aromatic or heteroaromatic compound, in particular when said dihalogenated aromatic or heteroaromatic compound is selected from dihalogenated aromatic sulfones, preferably from dihalodiphenyl sulfones, more preferably still from dichlorodiphenyl sulfones, more preferentially when said dihalogenated aromatic or heteroaromatic compound is 4,4'-dichlorodiphenyl sulfone.

At the end of the heating step, the semi-aromatic polyether obtained can be recovered by techniques known to the person skilled in the art, for example the precipitation of the semi-aromatic polyether. A preferred technique for the precipitation of the semi-aromatic polyether consists in adding the reaction medium to a large volume of water, approximately 10 times the volume of the reaction medium. The semi-aromatic polyether can then be dried according to techniques known to the person skilled in the art, for example in an oven under vacuum.

The method of the invention thus makes it possible to obtain semi-aromatic polyethers based on an aliphatic diol having physical properties which are particularly suited for producing films.

Thus, another subject of the invention relates to a semi-aromatic polyether based on an aliphatic diol, which can be obtained by the method according to the invention. This semi-aromatic polyether is characterized in that it corresponds to formula I:

[Chem. 1]

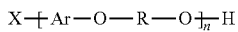

(I)

in which
Ar originates from a dihalogenated aromatic or heteroaromatic compound;
R originates from an aliphatic diol;
X is a halogen;
n is an integer between 2 and 100, with n being determined by size-exclusion chromatography.

The polydispersity index of the semi-aromatic polyether based on an aliphatic diol of the invention can be determined by techniques known to the person skilled in the art, in particular by size-exclusion chromatography, for example in dimethylformamide at 70° C. with a flow rate of 0.7 mL/min and with polystyrene calibration. The semi-aromatic polyether based on an aliphatic diol according to the invention has a polydispersity index of between 1.5 and 5, preferably of between 2 and 4.5.

The number-average molecular weight of the semi-aromatic polyether based on an aliphatic diol of the invention can be determined by techniques known to the person skilled in the art, in particular by size-exclusion chromatography, for example in dimethylformamide at 70° C. with a flow rate of 0.7 mL/min and with polystyrene calibration. Advantageously, the semi-aromatic polyether based on an aliphatic diol of the invention has a number-average molecular weight of greater than or equal to 5,000 g/mol, preferably greater than or equal to 6,000 g/mol, more preferably still greater than or equal to 7,000 g/mol. In one embodiment, the semi-aromatic polyether based on an aliphatic diol of the invention has a number-average molecular weight of between 6,000 and 9,000 g/mol, preferably between 6,500 and 9,000 g/mol, more preferably still between 7,000 and 9,000 g/mol, said number-average molecular weight being measured by size-exclusion chromatography in dimethylformamide at 70° C. with a flow rate of 0.7 mL/min and with polystyrene calibration.

The glass transition temperature of the semi-aromatic polyether based on an aliphatic diol of the invention can be determined by techniques known to the person skilled in the art, in particular by differential scanning calorimetry (DSC) with a flow rate of 80 mL/min in nitrogen at 10° C./min or 20° C./min, preferably 10° C./min, from 20° C. to 300° C. and in a pierced aluminum crucible. The semi-aromatic polyether of the invention has a glass transition temperature of greater than 100° C., preferably greater than 120° C., more preferably still greater than 140° C.

When the aliphatic diol is isosorbide, the glass transition temperature of the semi-aromatic polyether based on an aliphatic diol of the invention is greater than 140° C., preferably between 140° C. and 260° C., more preferably still between 150° C. and 250° C.

In one embodiment, the semi-aromatic polyether based on an aliphatic diol of the invention may be semi-crystalline. "Semi-crystalline polymer" means a polymer with crystalline regions and amorphous regions.

The contact angle of the semi-aromatic polyether of the invention may be determined by techniques known to the person skilled in the art, in particular by angle measurement with a goniometer. The semi-aromatic polyether to be obtained by the method according to the invention has a contact angle with water of between 50° and 70°, preferably approximately 63°.

Preferred semi-aromatic polyethers based on an aliphatic diol of formula I are those in which Ar, R, X and n are defined as follows:

Ar originates from a dihalogenated aromatic sulfone, a dihalogenated aromatic ketone, a dihalogenated benzonitrile, or a dihalogenated pyridine; preferably Ar originates from a dihalogenated diphenyl sulfone, a dihalogenated diphenyl ketone, a dihalogenated benzonitrile, or a dihalogenated pyridine; more preferably still Ar originates from a dichlorodiphenyl sulfone, a dichlorodiphenyl ketone, a dichlorobenzonitrile or a dichloropyridine; more preferentially, Ar is selected from:

[Chem. 2]

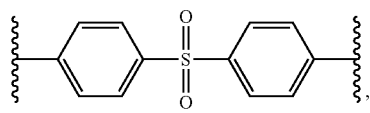

[Chem. 3]

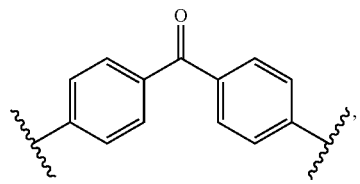

-continued

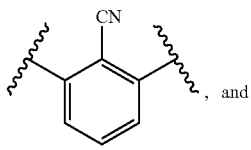, and

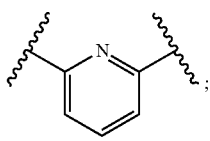;

even more preferentially, Ar is selected from:

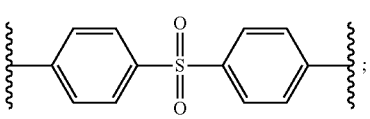;

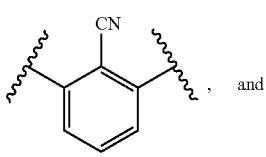, and

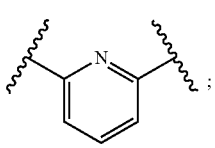;

R originates from an aliphatic diol; preferably, R originates from an aliphatic diol selected from linear aliphatic diols, branched aliphatic diols and cyclic aliphatic diols; more preferably still, R originates from an aliphatic diol selected from linear aliphatic diols and branched aliphatic diols;

X is a halogen; preferably, X is selected from F and Cl; more preferably still, X is Cl;

n is an integer of between 2 and 100, preferably n is an integer of between 10 and 100, n being determined by size-exclusion chromatography, preferably by size-exclusion chromatography in dimethylformamide at 70° C. with a flow rate of 0.7 mL/min and with polystyrene calibration.

In one embodiment, the semi-aromatic polyether based on an aliphatic diol is as defined by formula I, provided that R does not originate from isosorbide, cyclohexanedimethanol, tetramethylcyclobutanediol, or cis-1,5-cyclooctanediol when Ar originates from a 4,4'-halodiphenyl sulfone, and that R does not originate from isosorbide when Ar originates from a 4,4'-dihalobenzophenone.

In one embodiment, the aliphatic diol used in step a) of the method of the invention is a linear aliphatic diol. In this case, R originates from a linear aliphatic diol and the semi-aromatic polyethers based on an aliphatic diol according to the invention are those of formula Ia:

 (Ia)

wherein
X, Ar and n are as defined in the formula I, and
L originates from linear aliphatic diol; preferably, L originates from a linear aliphatic diol selected from ethylene glycol, 1,3-propanediol, 1,4-butanediol, 1,5-pentanediol, 1,6-hexanediol, 1,8-octanediol and 1,10-decanediol.

In one embodiment, the aliphatic diol used in step a) of the method of the invention is a branched aliphatic diol. In this case, R originates from a branched aliphatic diol and the semi-aromatic polyethers based on an aliphatic diol according to the invention are those of formula Ib:

 (Ib)

wherein
X, Ar and n are as defined in the formula I, and
B originates from a branched aliphatic diol; preferably, B originates from a branched aliphatic diol selected from 2-methyl-1,3-propanediol, 2,2-dimethylpropane-1,3-diol, 2,2,4-trimethyl-1,3-pentanediol, 2-ethyl-2-butyl-1,3-propanediol and propyleneglycol; preferably still, B originates from 2,2-dimethylpropane-1,3-diol.

In a preferred variant of this embodiment, the aliphatic diol used in step a) of the method of the invention is 2,2-dimethylpropane-1,3-diol. In this case, B originates from 2,2-dimethylpropane-1,3-diol and the semi-aromatic polyethers based on an aliphatic diol according to the invention are those of formula Ib-i:

 (Ib-i)

wherein X and Ar are as defined in formula Ib.

In a preferred embodiment, the aliphatic diol used in step a) of the method of the invention is a cyclic aliphatic diol. In this case, R originates from a cyclic aliphatic diol and the semi-aromatic polyethers based on an aliphatic diol according to the invention are those of formula Ic:

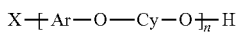 (Ic)

wherein
X, Ar and n are as defined in the formula I, and
Cy originates from a cyclic aliphatic diol; preferably, Cy originates from a cyclic aliphatic diol selected from cyclohexanedimethanols, tetramethylcyclohexanedimethanol, hydrogenated bisphenols, 1,5-cyclooctanediol, 1,4:3,6-dianhydrohexitols, spiroglycols, adamantanediols, and tricyclododecanedimethanol; preferably still, Cy originates from a cyclic aliphatic diol selected from 1,4:3,6-dianhydrohexitols, even more preferentially, Cy originates from isosorbide.

In a preferred embodiment variant, the cyclic aliphatic diol used in step a) of the method of the invention is a 1,4:3,6-dianhydrohexitol. In this case, Cy originates from a 1,4:3,6-dianhydrohexitol and the semi-aromatic polyethers based on an aliphatic diol according to the invention are those of formula Ic-i:

[Chem. 10]

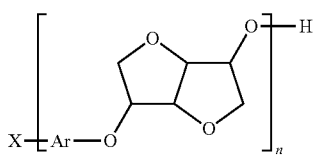
(Ic-i)

wherein Ar, X and n are as defined in formula I.

In an even more preferred variant of this embodiment, the cyclic aliphatic diol used in step a) of the method of the invention is isosorbide. In this case, Cy originates from isosorbide and the semi-aromatic polyethers based on an aliphatic diol according to the invention are those of formula Ic-ii:

[Chem. 11]

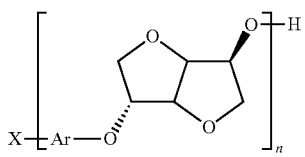
(Ic-ii)

wherein Ar, X and n are as defined in formula I.

In another preferred embodiment, the dihalogenated aromatic or heteroaromatic compound used in step a) of the method of the invention is 4,4'-dichlorodiphenyl sulfone. In this case, Ar originates from 4,4'-dichlorodiphenyl sulfone and the semi-aromatic polyethers based on an aliphatic diol according to the invention are those of formula II:

[Chem. 12]

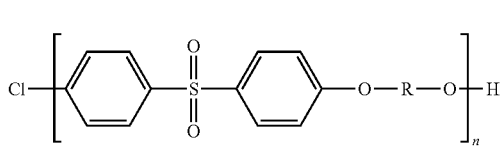
(II)

wherein n and R are as defined in formula I.

In a variant of this embodiment, the aliphatic diol used in step a) of the method of the invention is a linear aliphatic diol. In this case, R originates from a linear aliphatic diol and the semi-aromatic polyethers based on an aliphatic diol according to the invention are those of formula IIa:

[Chem. 13]

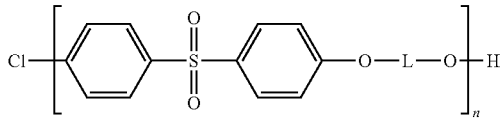
(IIa)

wherein n and L are as defined in formula Ia.

In another variant of this embodiment, the aliphatic diol used in step a) of the method of the invention is a branched aliphatic diol. In this case, R originates from a branched aliphatic diol and the semi-aromatic polyethers based on an aliphatic diol according to the invention are those of formula IIb:

[Chem. 14]

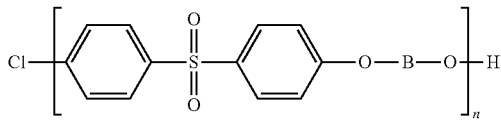
(IIb)

wherein n and B are as defined in formula Ib.

Preferably, the branched aliphatic diol used in step a) of the method of the invention is 2,2-dimethylpropane-1,3-diol. In this case, B originates from 2,2-dimethylpropane-1,3-diol and the semi-aromatic polyether based on an aliphatic diol according to the invention is that of formula IIb-i:

[Chem. 15]

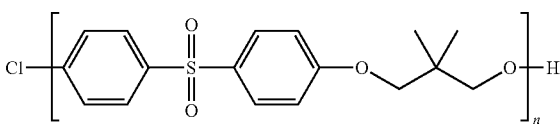
(IIb-i)

wherein n is as defined in formula Ib.

In another variant of this embodiment, the aliphatic diol used in step a) of the method of the invention is a cyclic aliphatic diol. In this case, R originates from a cyclic aliphatic diol and the semi-aromatic polyethers based on an aliphatic diol according to the invention are those of formula IIc:

[Chem. 16]

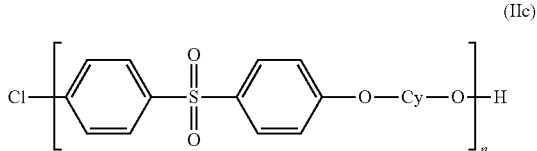
(IIc)

wherein n and Cy are as defined in formula Ic.

Preferably, the cyclic aliphatic diol used in step a) of the method of the invention is a 1,4:3,6-dianhydrohexitol. In this case, Cy originates from a 1,4:3,6-dianhydrohexitol and the semi-aromatic polyethers based on an aliphatic diol according to the invention are those of formula IIc-i:

[Chem. 17]

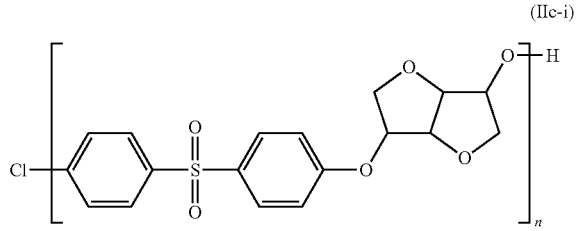

(IIc-i)

wherein n is as defined in formula Ic.

More preferably still, the cyclic aliphatic diol used in step a) of the method of the invention is isosorbide. In this case, Cy originates from isosorbide and the semi-aromatic polyether based on an aliphatic diol according to the invention is that of formula IIc-ii:

[Chem. 18]

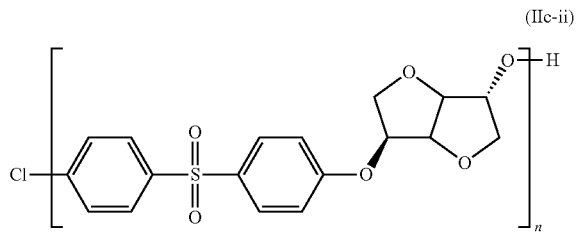

(IIc-ii)

wherein n is as defined in formula Ic.

In another preferred embodiment, the dihalogenated aromatic or heteroaromatic compound used in step a) of the method of the invention is 2,6-dichlorobenzonitrile. In this case, Ar originates from 2,6-dichlorobenzonitrile and the semi-aromatic polyethers based on an aliphatic diol according to the invention are those of formula III:

[Chem. 19]

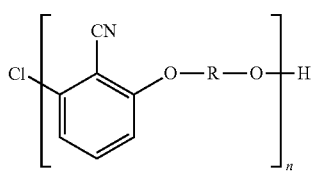

(III)

wherein n and R are as defined in formula I.

In another variant of this embodiment, the aliphatic diol used in step a) of the method of the invention is a cyclic aliphatic diol. In this case, R originates from a cyclic aliphatic diol and the semi-aromatic polyethers based on an aliphatic diol according to the invention are those of formula IIIa:

[Chem. 20]

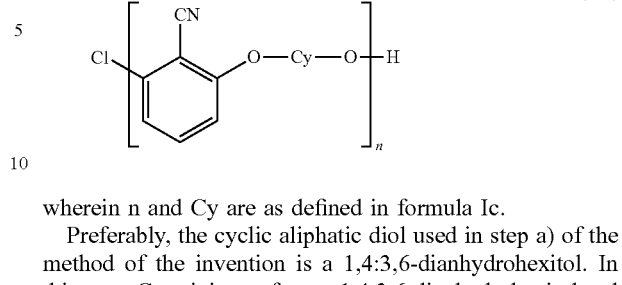

(IIIa)

wherein n and Cy are as defined in formula Ic.

Preferably, the cyclic aliphatic diol used in step a) of the method of the invention is a 1,4:3,6-dianhydrohexitol. In this case, Cy originates from a 1,4:3,6-dianhydrohexitol and the semi-aromatic polyethers based on an aliphatic diol according to the invention are those of formula IIIa-i:

[Chem. 21]

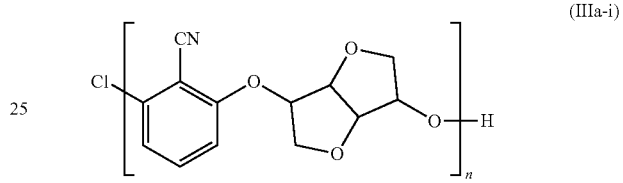

(IIIa-i)

wherein n is as defined in formula Ic.

More preferably still, the cyclic aliphatic diol used in step a) of the method of the invention is isosorbide. In this case, Cy originates from isosorbide and the semi-aromatic polyether based on an aliphatic diol according to the invention is that of formula IIIa-ii:

[Chem. 22]

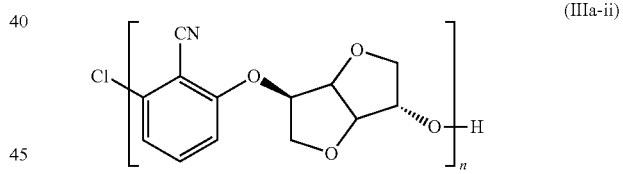

(IIIa-ii)

wherein n is as defined in formula Ic.

In another preferred embodiment, the dihalogenated aromatic or heteroaromatic compound used in step a) of the method of the invention is 2,6-dichloropyridine. In this case, Ar originates from 2,6-dichloropyridine and the semi-aromatic polyethers based on an aliphatic diol according to the invention are those of formula IV:

[Chem. 23]

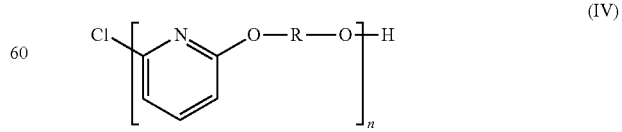

(IV)

wherein n and R are as defined in formula I.

In another variant of this embodiment, the aliphatic diol used in step a) of the method of the invention is a cyclic aliphatic diol. In this case, R originates from a cyclic aliphatic diol and the semi-aromatic polyethers based on an aliphatic diol according to the invention are those of formula IVa:

[Chem. 24]

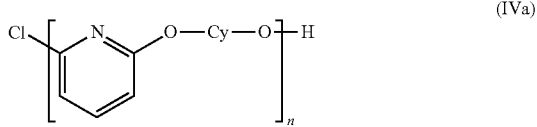

(IVa)

wherein n and Cy are as defined in formula Ic.

Preferably, the cyclic aliphatic diol used in step a) of the method of the invention is a 1,4:3,6-dianhydrohexitol. In this case, Cy originates from a 1,4:3,6-dianhydrohexitol and the semi-aromatic polyethers based on an aliphatic diol according to the invention are those of formula IVa-i:

[Chem. 25]

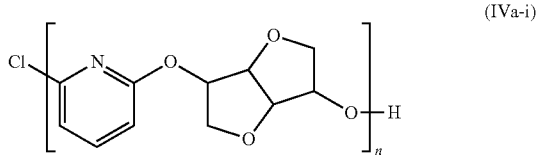

(IVa-i)

wherein n is as defined in formula Ic.

More preferably still, the cyclic aliphatic diol used in step a) of the method of the invention is isosorbide. In this case, Cy originates from isosorbide and the semi-aromatic polyether based on an aliphatic diol according to the invention is that of formula IVa-ii:

[Chem. 26]

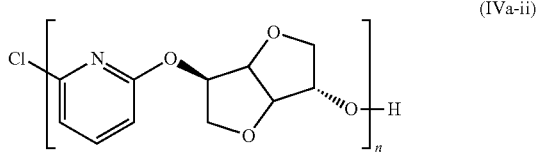

(IVa-ii)

wherein n is as defined in formula Ic.

In another embodiment, the dihalogenated aromatic or heteroaromatic compound used in step a) of the method of the invention is a dichlorinated aromatic compound. In this case, the semi-aromatic polyethers based on an aliphatic diol according to the invention are those of formula I, wherein X is chlorine.

According to this embodiment, the semi-aromatic polyether based on an aliphatic diol according to the invention contains a residual fluorine content of less than 100 ppm, said residual fluorine content being determined by combustion/ion chromatography coupling.

According to this embodiment, the semi-aromatic polyether based on an aliphatic diol according to the invention also contains a residual silicon content of between 10 and 1000 ppm, said residual silicon content being determined by combustion/ion chromatography coupling.

According to this embodiment, the semi-aromatic polyether based on an aliphatic diol according to the invention contains a residual chlorine content of between 100 and 10,000 ppm, said residual chlorine content being determined by combustion/ion chromatography coupling.

Advantageously, the semi-aromatic polyether based on an aliphatic diol according to the invention has solubility parameters enabling it to be soluble in a solvent suitable for producing films. Thus, the semi-aromatic polyether based on an aliphatic diol according to the invention, preferably the semi-aromatic polyether based on an aliphatic diol of formula IIc-ii, has a good solubility at a concentration of 10 mg/mL at room temperature (20-25° C.) in solvents selected from formic acid, acetonitrile, acetic acid, dimethyl sulfoxide, acrylonitrile, epichlorohydrin, acetone, methyl acetate, N,N-dimethylformamide, 2-methoxyethanol, propylene carbonate, butan-2-one, 2-ethoxyethanol, dimethylethanolamine, pyridine, furfurylic alcohol, N-methyl-2-pyrrolidine, benzaldehyde, benzyl alcohol, isophorone, hydrazine, dimethylisosorbide, and methyl 4-(dimethylcarbamoyl)-2-methylbutanoate, preferably from dimethyl sulfoxide, acrylonitrile, N,N-dimethylformamide, N-methyl-2-pyrrolidine, and methyl 4-(dimethylcarbamoyl)-2-methylbutanoate.

Thus, another subject of the present invention relates to the use of the semi-aromatic polyether based on an aliphatic diol according to the invention for the manufacture of membranes, manufactured parts and coatings.

Membranes may be manufactured from the semi-aromatic polyether based on an aliphatic diol of the invention according to techniques known to the person skilled in the art.

In particular, the membranes obtained with the semi-aromatic polyether based on an aliphatic diol according to the invention have beneficial properties of hydrophilicity and gas permeability. The membranes may be in the form of porous or non-porous films. The membranes can be manufactured in the form of monofilaments or hollow fibers.

The semi-aromatic polyether based on an aliphatic diol according to the invention can be used in aqueous media, including body fluids. The semi-aromatic polyether based on an aliphatic diol according to the invention is biocompatible and can therefore be used in membrane form in the medical field, such as for hemodialysis or in the consumer field (food and beverages), in the waste water treatment field.

Porous membranes in the form of tubes or hollow fibers may have different pore sizes known to the person skilled in the art depending on their application (microfiltration, ultrafiltration, nanofiltration, reverse osmosis). The performance of the aqueous membranes obtained with the semi-aromatic polyether according to the invention may be improved by techniques known to the person skilled in the art, in particular the use of sulfonated monomers or the post-treatment of the membranes by sulfonation or surface treatment to avoid fouling.

The membranes in the gas phase can be used for the production of nitrogen from the separation of the nitrogen mixture, oxygen from the air, the production of methane from the separation of methane and $CO_2$. The performance of the gaseous membranes obtained with the semi-aromatic polyether according to the invention may be improved by techniques known to the person skilled in the art; in particular, the use of hindered monomers or the addition of additives such as substituted bisphenols, naphthalenes or fluorenes or the use of thermally labile compounds to form pores.

Membranes in the form of films or sheets can be used for optics or packaging.

Molded parts may be manufactured from the semi-aromatic polyether based on an aliphatic diol of the invention according to techniques known to the person skilled in the art. Injection molding of the semi-aromatic polyether based on an aliphatic diol according to the invention may lead to the production of parts used in the health sector, with dental applications to replace metals, glass and other disposable or reusable utensils, but also in the aviation, electronics and automotive sectors.

Another subject of the invention relates to the use of the semi-aromatic polyether based on an aliphatic diol according to the invention as a coating resin for metals in order to prevent corrosion.

The coating obtained from the semi-aromatic polyether based on an aliphatic diol according to the invention can be applied to steel, aluminum, copper, metals used in the consumer sector (food and beverage), the marine sector with boat hulls, aerospace, automotive, electrical sectors with cables and electronics with circuits. The resin of the semi-aromatic polyether based on an aliphatic diol according to the invention may also be applied to other substrates such as glass or carbon fiber to form a composite after evaporation of the solvent from the resin. The composites formed from the semi-aromatic polyether resin based on an aliphatic diol according to the invention can be used in the aerospace and automotive field to replace metal parts.

The invention will be understood more clearly upon reading the following examples, which are intended to be purely illustrative and do not in any way limit the scope of protection.

EXAMPLES

Abbreviations

DCBN: 2,6-dichlorobenzonitrile
DCDPS: 4,4'-dichlorodiphenyl sulfone,
DCP: 2,6-dichloropyridine,
DFBN: 2,6-difluorobenzonitrile,
DFDPS: 4,4'-difluorodiphenyl sulfone,
DFP: 2,6-difluoropyridine,
DMAc: dimethylacetamide,
DMF: N,N-dimethylformamide,
DMSO: dimethylsulfoxide,
DSC: Differential scanning calorimetry,
PDI: polydispersity index,
Mn: number-average molecular weight,
NMP: N-methyl-2-pyrrolidone,
PS: polystyrene,
SEC: size-exclusion chromatography,
Tm: Melting point
Tg: glass transition temperature,
THF: tetrahydrofuran.

For the illustrative examples presented below, the following reagents were used:
Isosorbide (purity >99.5%): Polysorb® LP from Roquette Frères,
DCDPS (purity >99%): Alfa Aesar,
SiOMe$_3$K/THF (2M): Acros Organics,
2,2-dimethylpropane-1,3-diol (>99%): Acros Organics,
Bisphenol A (>99%): Sigma Aldrich,
K$_2$CO$_3$ (>99%): Sigma Aldrich,
DFDPS (>99%): Sigma Aldrich,
DFP (>99%): Acros Organics,
DCP (>98%): Acros Organics,
DFBN (>99%): Acros Organics,
DCBN (>90%): Fluka purified by sublimation.

Example 1: Preparation of a Semi-Aromatic Polyether Sulfone According to the Invention Based on Isosorbide 1.46 g (0.01 mol, 1 eq) of isosorbide (preserved in a desiccator) and 2.87 g (0.01 mol, 1 eq) of DCDPS are solubilized in 10.11 g of DMSO in a three-necked flask equipped with a gooseneck, a stirrer blade and a nitrogen inlet. The reaction medium is immersed in an oil bath and is heated to 40° C. to solubilize both monomers. 9.05 g (0.0199 mol, 1.99 eq) of SiOMe$_3$K solubilized in THF (2 M) are added. After the addition of the base, the temperature is gradually increased for several hours to 100° C. and then the medium is left with stirring for 2 hours at 100° C. The medium then becomes more viscous. The medium is then precipitated in 300 mL of distilled water and the product obtained is rinsed once with water and then once with the water/methanol 80:20 (v/v) mixture. The product is recovered by Büchner filtration and dried with an oven under vacuum.

Example 2: Preparation of a Semi-Aromatic Polyether Sulfone According to the Invention Based on dimethylpropane-1,3-diol 1.04 g (0.01 mol, 1 eq) of 2,2-dimethylpropane-1,3-diol and 2.87 g (0.01 mol, 1 eq) of DCDPS are solubilized in in 9.13 g of DMSO in a three-necked flask equipped with a gooseneck, a stirrer blade and a nitrogen inlet. The reaction medium is immersed in an oil bath and is heated to 40° C. to solubilize both monomers. 9.05 g (0.0199 mol, 1.99 eq) of SiOMe$_3$K solubilized in THF (2 M) are added. After the addition of the base, the temperature is gradually increased to 100° C. and remains at this temperature for 1 hour. The medium then becomes more viscous. The medium is then precipitated in 300 mL of distilled water and the product obtained in the form of a white powder is recovered by Büchner filtration and dried with an oven under vacuum. The polymer has a melting point Tm of 290° C.

Example 3: Preparation of a Semi-Aromatic Polyether Nitrile According to the Invention From Isosorbide and Dichlorobenzonitrile 1.46 g (0.01 mol, 1 eq) of isosorbide (preserved in a desiccator) and 1.72 g (0.01 mol, 1 eq) of DCBN are solubilized in 7.42 g of DMSO in a three-necked flask equipped with a gooseneck, a stirrer blade and a nitrogen inlet. The reaction medium is immersed in an oil bath and is heated to 30° C. to solubilize the isosorbide. 9.05 g (0.0199 mol, 1.99 eq) of SiOMe$_3$K solubilized in THF (2 M) are added. After the addition of base, the temperature is fixed at 30° C. for 1 hour 30. The temperature is then fixed at 100° C. and the medium is left with stirring for 2 hours at 100° C. The medium then becomes more viscous. The medium is then precipitated in 300 mL of distilled water. The product is recovered by Büchner filtration and dried with an oven under vacuum.

Example 4: Preparation of a Semi-Aromatic Polyether Nitrile According to the Invention From Isosorbide and Dichloropyridine 1.46 g (0.01 mol, 1 eq) of isosorbide (preserved in a desiccator) and 1.48 g (0.01 mol, 1 eq) of DCP are solubilized in 6.86 g of DMSO in a three-necked flask equipped with a gooseneck, a stirrer blade and a nitrogen inlet. The reaction medium is immersed in an oil bath and is heated to 40° C. to solubilize the isosorbide. 9.05 g (0.0199 mol, 1.99 eq) of SiOMe$_3$K solubilized in THF (2 M) are added. After the addition of base, the temperature is fixed at 100° C. for 2 hours. The medium then becomes more viscous. The medium is then precipitated in 300 mL of distilled water. The product is recovered by Büchner filtration and dried with an oven under vacuum.

Counter-Example 1: Preparation of an Aromatic Polyether Sulfone Based on Bisphenol A 11.53 g (0.050 mol, 1 eq) of bisphenol A, 14.51 g (0.050 mol, 1 eq) of DCDPS and 15.35 g (0.10 mol, 2 eq) of K$_2$CO$_3$ are solubilized in a 67:33 DMAc/toluene mixture (69 g of DMAc and 34 g of toluene, or 20% m) in a three-necked flask equipped with a Dean-Stark apparatus filled with toluene and with a condenser above it, a mixer blade and a nitrogen inlet. The flask is heated for 14 hours at 160° C. The reaction medium is diluted in the NMP and then precipitated in water in the form of white threads. The polymer is recovered by Büchner filtration and dried with an oven under vacuum.

Counter-Example 2: Preparation of a Semi-Aromatic Polyether Sulfone Based on Isosorbide Following the Method Described in WO 2014/072473 A2 (Example 8)

2.0 g (0.014 mol, 1 eq) of isosorbide (placed in a desiccator), 4.1 g (0.014 mol, 1 eq) of DCDPS and 3.78 g (0.028 mol, 2 eq) of K$_2$CO$_3$ are solubilized in 9 g of sulfolane in a three-necked flask equipped with a gooseneck, a stirrer blade and a nitrogen inlet. The flask is heated to 210° C. with an oil bath for 6 hours. The reaction medium is diluted in the NMP and then precipitated in the form of a beige powder in a 50:50 (v/v) mixture of 300 mL water/methanol, Büchner filtered and then dried with an oven under vacuum.

Counter-Example 3: Preparation of a Semi-Aromatic Polyether Sulfone Based on Isosorbide and DFDPS at 140° C.

2.92 g (0.020 mol, 1 eq) of isosorbide (placed in a desiccator), 5.08 g (0.020 mol, 1 eq) of DFDPS and 5.58 g (0.040 mol, 2 eq) of K$_2$CO$_3$ are solubilized in 18.7 g of DMSO in a three-necked flask equipped with a gooseneck, a stirrer blade and a nitrogen inlet. The round-bottomed flask is heated to 140° C. using an oil bath for 24 hours. At the end of the reaction, 15 mL of DMSO is added to dilute the medium. The reaction medium is then precipitated in the form of threads in 1,000 mL of water, Büchner filtered, and then dried with an oven under vacuum.

Counter-Example 4: Commercial Polyethersulfone

A commercial granulated resin purchased from Acros Organics was used for elemental analysis comparison (Acros code: 17891, CAS: 25135-51-7).

Counter-Example 5: Preparation of a Semi-Aromatic Polyether Nitrile From Isosorbide and Difluorobenzonitrile 1.37 g (9.4 mmol, 1 eq) of isosorbide (placed in a desiccator), 1.30 g (9.4 mmol, 1 eq) of DFBN, 2.59 g (18.7 mmol, 2 eq) of K$_2$CO$_3$ and 1.03 g (10.3 mmol, 1.1 eq) of CaCO$_3$ are solubilized in 6.61 g of DMSO in a three-necked flask equipped with a gooseneck, a stirrer blade and a nitrogen inlet. The round-bottomed flask is heated to 140° C. using an oil bath for 24 hours then to 160° C. for 24 hours. At the end of the reaction, 10 mL of DMSO is added to dilute the medium. The reaction medium is then precipitated in the form of threads in 300 mL of water, Büchner filtered, and then dried with an oven under vacuum.

Counter-Example 6: Preparation of a Semi-Aromatic Polyether Nitrile From Isosorbide and Dichlorobenzonitrile 2.92 g (20 mmol, 1 eq) of isosorbide (placed in a desiccator), 3.44 g (20 mmol, 1 eq.) of DCBN and 5.58 g (40 mmol, 2 eq) of K$_2$CO$_3$ are solubilized in 25.45 g of sulfolane in a three-necked flask equipped with a gooseneck and a nitrogen inlet. The round-bottomed flask is heated to 210° C. using an oil bath for 4 hours. At the end of the reaction, the reaction medium is precipitated in the form of threads in 300 mL of water, Büchner filtered, and then dried with an oven under vacuum.

Counter-Example 7: Preparation of a Semi-Aromatic Polyether Pyridine From Isosorbide and Difluoropyridine 1.46 g (10 mmol, 1 eq) of isosorbide (placed in a desiccator), 1.15 g (10 mmol, 1 eq) of DFP, 1.1 g (11 mmol, 1 eq) of CaCO$_3$ and 2.76 g (20 mmol, 2 eq) of K$_2$CO$_3$ are solubilized in 6.61 g of DMSO in a three-necked flask equipped with a gooseneck, a stirrer blade and a nitrogen inlet. The flask is heated to 120° C. using an oil bath for 15 hours then to 140° C. for 48 hours. At the end of the reaction, 2 mL of DMSO are added to dilute the medium. The reaction medium is then precipitated in the form of threads in 300 mL of water, Büchner filtered, and then dried with an oven under vacuum.

The number-average molecular weights (Mn) and polydisperity indices (PDI) of the polyethers obtained are determined by size-exclusion chromatography (SEC). The glass transition temperatures (Tg) and melting points (Tm) of the polyethers obtained are determined by differential scanning calorimetry (DSC).

The characterizations applied to the examples are described below:
Differential Scanning calorimetry (DSC): the differential scanning calorimetry analysis was performed on a DSC-, Mettler Toledo with a flow rate of 80 mL/min in nitrogen at 10° C./min or 20° C./min from 20° C. to 300° C. and in a pierced aluminum crucible.
Size-exclusion chromatography (SEC): The estimation of the number-average molecular weights was carried out by SEC with an Agilent PLgel 5 μm column in DMF at 70° C. with a flow rate of 0.7 mL/min and with PS calibration.
Elemental analysis: estimation of the amount of an atom in mg/kg (ppm) on a 20 g sample by combustion/ion chromatography coupling.

The characterizations of the polymers according to the invention (examples 1 to 4) are presented in tables 1 and 2 in comparison with the counter-examples 1 to 3 and 5 to 7.

TABLE 1

|  | Example 1 | Example 2[a] | Counter-example 1 | Counter-example 2 | Counter-example 3 |
|---|---|---|---|---|---|
| Diol | Isosorbide | Dimethylpropane-1,3-diol | BPA | Isosorbide | Isosorbide |
| Sulfone | DCDPS | DCDPS | DCDPS | DCDPS | DFDPS |
| Synthesis time | 10 h | 1 h | 14 h | 6 h | 24 h |
| Temperature (° C.) | 40-100 | 40-100 | 160 | 210 | 140 |
| Solvent/Co-solvent | DMSO/— | DMSO/— | DMAC/toluene | sulfolane/— | DMSO |
| Dilution | — | — | NMP | NMP | — |
| Base used | SiOMe$_3$K | SiOMe$_3$K | K$_2$CO$_3$ | K$_2$CO$_3$ | K$_2$CO$_3$ |
| Molecular weight Mn (g/mol)[b] | 7,800 | insoluble | 8,630 | 2,130 | 8,860 |
| PDI | 3.8 | insoluble | 3.9 | 2.1 | 3.9 |
| Tg or Tm (° C.) (20° C./min) | 234[c] | 289[d] | 195[c] | 155[c] | 237[c] |
| Polymer color | white | white | white | brown | off-white |

[a]Semi-crystalline polymer insoluble in DMF
[b]Measurements with polystyrene calibration.
[c]Glass transition temperature (Tg).
[d]Melting point (Tm).

TABLE 2

|  | Example 3 | Example 4 | Counter-example 5 | Counter-example 6 | Counter-example 7 |
|---|---|---|---|---|---|
| Dihalogenated compound | DCBN | DCP | DFBN | DCBN | DFP |
| Synthesis time | 3 h 30 | 2 h 40 | 48 h | 4 h | 63 h |
| Temperature (° C.) | 30-100 | 100 | 140-160 | 210 | 120-140 |
| Solvent | DMSO | DMSO | DMSO | Sulfolane | DMSO |
| Dilution | — | — | DMSO | — | DMSO |
| Base used | SiOMe$_3$K | SiOMe$_3$K | K$_2$CO$_3$ | K$_2$CO$_3$ | K$_2$CO$_3$ |
| Tg (° C.) (10° C./min) | 186 | 157 | 216 | 142 | 138 |

Table 2 shows that, with the SiOMe$_3$K base, for short, low-temperature reactions, glass transitions are obtained for samples obtained from chlorinated monomers which are higher compared with reactions using K$_2$CO$_3$.

The residual chlorine, fluorine, and silicon contents were measured for example 1 and counter-examples 3 and 4 by combustion/ion chromatography coupling. The results are presented in table 3. These results show that example 1 has a residual fluorine content of less than 100 ppm and a silicon content of 80 ppm due to the use of the SiOMe$_3$K base

TABLE 3

|  | Example 1 | Counter-example 3 | Counter-example 4 |
|---|---|---|---|
| Chlorine (mg/kg = ppm) | 1,310 | <100 | 1,970 |
| Fluorine (mg/kg = ppm) | <100 | 3,230 | <25 |
| Silicon (mg/kg = ppm) | 80 | <10 | <10 |

Preparation of a Membrane

A membrane can be prepared from a solution of the polymer at 20% by weight in the DMSO cast onto a glass plate. The solvent is then evaporated using the following thermal cycle: 80° C. for 1 hour, 100° C. for 1 hour, 120° C. for 1 hour and 150° C. for 1 hour and 180° C. for 2 hours. After curing, a transparent and relatively uncolored membrane is obtained for example 1.

Membranes are also obtained with counter-examples 1 and 3 using NMP as solvent.

By contrast, the counter-example 2 is not film-forming.

These results are presented in table 4.

TABLE 4

|  | Example 1 | Counter-example 1 | Counter-example 2 | Counter-example 3 |
|---|---|---|---|---|
| Film | yes | yes | no | yes |

These results show that the method of the invention makes it possible to obtain at low temperature, i.e. at a temperature of between 40° C. and 100° C., from 4,4'-dichlorodiphenyl sulfone, a semi-aromatic polyether based on isosorbide having sufficient mechanical properties to enable the production of a film.

For comparison, the manufacture of an aromatic polyether sulfone based on bisphenol A having sufficient mechanical properties to enable the production of a film requires 14 hours of heating at 160° C. (counter-example 1) and the manufacture from K$_2$CO$_3$ as base of an aromatic polyether sulfone based on isosorbide and 4,4'-difluorodiphenyl sulfone having sufficient mechanical properties to enable the production of a film requires 24 h of heating at 140° C. (counter-example 3).

Finally, the reproduction of the operating conditions described in application WO 2014/072473 A2 does not make it possible to produce a semi-aromatic polyether based on isosorbide with sufficient mechanical properties to enable the production of a film (counter-example 2).

The characterizations applied to the membranes are described below:

Contact angle: the contact angle was measured with water according to the Young equation:

$$\sigma_s = \gamma_{sl} + \sigma_l \cdot \cos\theta \qquad \text{[Math. 1]}$$

wherein

σs is the surface tension of the solid/gas interfaces,

γsl is the surface tension of the solid/liquid interfaces,

σl is the surface tension of the liquid/gas interfaces, and

θ is the contact angle.

TABLE 5

|  | Contact angle (°) with water |
| --- | --- |
| Example 1 | 63 |
| Counter-example 1 | 89 |
| Counter-example 2 | No film |

The contact angle of the film obtained from the semi-aromatic polyether in example 1 obtained by the method according to the invention shows that the polymer is more hydrophilic than the reference polysulfone based on bisphenol (table 5). The hydrophilicity of the semi-aromatic polyether is an advantage for aqueous phase separation properties.

LIST OF CITED DOCUMENTS

Patent Documents

For any useful purpose, the following patent document(s) is (are) cited:

patcit1: WO 2013/023997 A1 (publication number)

patcit2: WO 2014/072473 A2 (publication number), and patcit3: US 2015/0129487 A1 (publication number).

Non-Patent Literature

For any useful purpose, the following non-patent element(s) is (are) cited:

nplcit1: H. Kricheldorf et al., J. Polymer Sci., Part A: Polym. Chem., 1995, 33, 2667-2671;

nplcit2: S. Chatti et al., High perform. Polym., 2009, 21, 105-118;

nplcit3: H. W. Kim et al., Journal of Membrane Science, vol. 372, no. 1, p. 116-124, 2011;

nplcit4: K. M. Diederichsen et al., Macromolecules, Vol. 50, no. 10, p. 3831-3840, 2017;

nplcit5: H. J. Lee, et al., Journal of Membrane Science, vol. 485, p. 10-16, 2015;

nplcit6: L. Jujie, X. He, et al, J Polym Res, vol. 24, no. 1, p. 1, 2017;

nplcit7: L. F. Hancock, et al., Biomaterials, vol. 21, no. 7, p. 725-733, 2000;

nplcit8: L. Wang et al., Polymer Chemistry, Vol. 5, no. 8, p. 2836-2842, 2014; and nplcit9: R. N. Johnson and A. G. Farnham, J. Polym. Sci. A-1 Polym. Chem., vol. 5, no. 9, p. 2415-2427, 1967.

The invention claimed is:

1. A semi-aromatic polyether based on an aliphatic diol of formula I:

[Chem. 1]

(I)

wherein

Ar originates from a dihalogenated aromatic or heteroaromatic compound selected from dihalogenated aromatic sulfones, dihalogenated aromatic ketones, dihalogenated benzonitriles, dihalogenated diazenes, bis(halophenyl)oxadiazoles, dihalogenated nitrobenzenes, dihalogenated benzoylnaphthalenes and dihalogenated pyridines;

R originates from an aliphatic diol;

X is a chlorine;

n is an integer between 2 and 100, with n being determined by size-exclusion chromatography;

provided that R does not originate from isosorbide, cyclohexanedimethanol, tetramethylcyclobutanediol, or cis-1,5-cyclooctanediol when Ar originates from a 4,4'-halodiphenyl sulfone, and that R does not originate from isosorbide when Ar originates from a 4,4'-dihalobenzophenone;

wherein the semi-aromatic polyether based on an aliphatic diol contains residual silicon content of between 10 and 1,000 ppm, said residual silicon content being determined by combustion/ion chromatography coupling.

2. The semi-aromatic polyether based on an aliphatic diol according to claim 1, wherein R originates from an aliphatic diol selected from linear aliphatic diols and branched aliphatic diols.

3. The semi-aromatic polyether based on an aliphatic diol according to claim 1, wherein R originates from a 1,4:3,6-dianhydrohexitol.

4. The semi-aromatic polyether based on an aliphatic diol according to claim 1, wherein its polydispersity index is between 1.5 and 5.

5. The semi-aromatic polyether based on an aliphatic diol according to claim 1, wherein its number-average molecular weight is greater than or equal to 5,000 g/mol, said number-average molecular weight being measured by size-exclusion chromatography in dimethylformamide at 70° C. with a flow rate of 0.7 mL/min and with polystyrene calibration.

6. The semi-aromatic polyether based on an aliphatic diol according to claim 1, wherein it has a glass transition temperature of greater than 100° C.

7. The semi-aromatic polyether based on an aliphatic diol according to claim 1, wherein it contains a residual fluorine content of less than 100 ppm, said residual fluorine content being determined by combustion/ion chromatography coupling.

8. The semi-aromatic polyether based on an aliphatic diol according to claim 1, wherein it contains a residual chlorine content of between 100 and 10,000 ppm, said residual chlorine content being determined by combustion/ion chromatography coupling.

* * * * *